(12) United States Patent
Ogawa et al.

(10) Patent No.: US 9,240,746 B2
(45) Date of Patent: Jan. 19, 2016

(54) DRIVING APPARATUS FOR VIBRATION-TYPE ACTUATOR

(75) Inventors: Ryota Ogawa, Kawasaki (JP); Kenichi Kataoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 13/606,477

(22) Filed: Sep. 7, 2012

(65) Prior Publication Data

US 2013/0063054 A1 Mar. 14, 2013

(30) Foreign Application Priority Data

Sep. 13, 2011 (JP) .................................. 2011-199514

(51) Int. Cl.
*H02P 1/00* (2006.01)
*H02P 25/02* (2006.01)

(52) U.S. Cl.
CPC .................................. *H02P 25/027* (2013.01)

(58) Field of Classification Search
USPC ......... 318/114, 122, 123, 126, 128, 129, 134; 310/51, 316.01, 316.02
See application file for complete search history.

(56) References Cited

U.S. PATENT DOCUMENTS

| | | | | |
|---|---|---|---|---|
| 3,435,378 A * | 3/1969 | Birt | ............................... | 332/179 |
| 5,539,268 A * | 7/1996 | Kataoka | .................... | 310/316.02 |
| 5,841,215 A * | 11/1998 | Takeishi | .................... | 310/316.01 |
| 6,100,622 A * | 8/2000 | Yamamoto et al. | ....... | 310/316.01 |
| 6,313,564 B1 * | 11/2001 | Kataoka et al. | .......... | 310/316.01 |
| 6,635,977 B2 * | 10/2003 | Kataoka et al. | .......... | 310/316.01 |
| 6,744,227 B2 * | 6/2004 | Kataoka | ........................ | 318/114 |
| 6,954,022 B2 * | 10/2005 | Kataoka | ........................ | 310/317 |
| 7,129,618 B2 * | 10/2006 | Fujimoto et al. | .......... | 310/316.01 |
| 7,239,200 B2 * | 7/2007 | Ishii et al. | ........................ | 330/10 |
| 7,423,361 B2 * | 9/2008 | Tanaka | ..................... | 310/316.01 |
| 8,457,192 B2 * | 6/2013 | Malmqvist | .................... | 375/238 |
| 2004/0150357 A1 * | 8/2004 | Endo | ............................. | 318/114 |
| 2007/0159507 A1 * | 7/2007 | Urano | ............................ | 347/20 |
| 2011/0227511 A1 * | 9/2011 | Kataoka et al. | ............... | 318/116 |

FOREIGN PATENT DOCUMENTS

| | | | |
|---|---|---|---|
| JP | 63-305771 A | 12/1988 |
| JP | 06-153537 A | 5/1994 |
| JP | 2003-289681 A | 10/2003 |
| JP | 2007-189823 A | 7/2007 |

* cited by examiner

*Primary Examiner* — Eduardo Colon Santana
*Assistant Examiner* — Bickey Dhakal
(74) *Attorney, Agent, or Firm* — Canon USA, Inc. IP Division

(57) ABSTRACT

A driving apparatus for a vibration-type actuator that applies an AC voltage to an electro-mechanical energy conversion element and generates a driving force between a vibration member and a movable member includes a voltage amplitude command unit configured to instruct an amplitude of the AC voltage, a pulse width command unit configured to monotonically increase a pulse width command and a change rate of the pulse width command according to an increase in a voltage amplitude command, and output a pulse width command, and a pulse signal generation unit configured, when a pulse signal that directly or indirectly generates the AC voltage is generated at the same frequency as the AC voltage to apply the AC voltage to the electro-mechanical energy conversion element, to generate a pulse signal having a pulse width corresponding to the pulse width command based on the pulse width command.

8 Claims, 14 Drawing Sheets

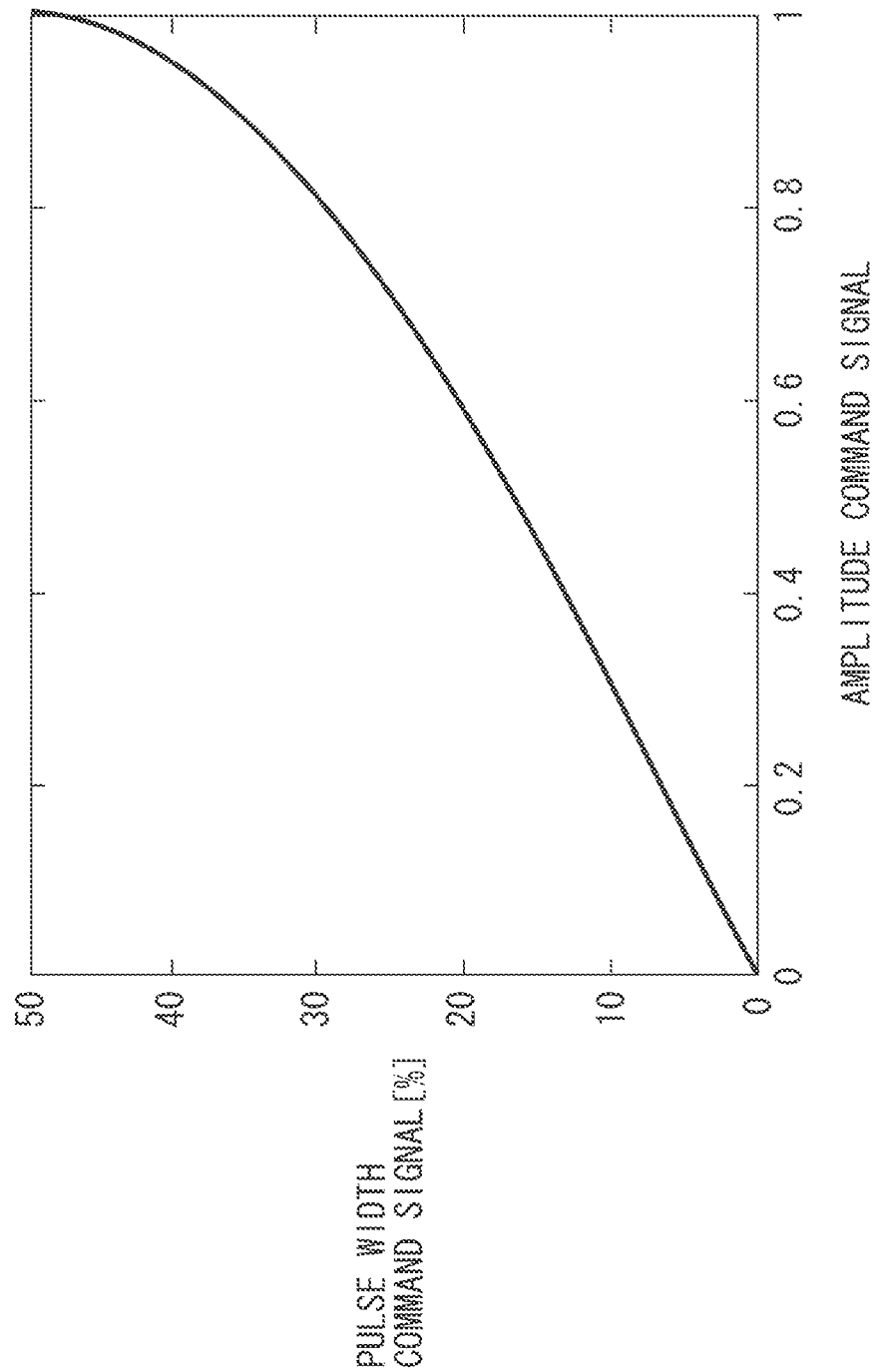

DRIVING APPARATUS FOR VIBRATION-TYPE ACTUATOR

BACKGROUND OF THE INVENTION

1. Field of the Invention

One disclosed aspect of the embodiments relates to a driving apparatus for a vibration-type actuator. In particular, one embodiment relates to a driving apparatus for a vibration-type actuator in which a unit that generates an AC voltage applied to an electro-mechanical energy conversion element is a pulse generation unit and an amplitude of the AC voltage is changed by adjusting a pulse width.

2. Description of the Related Art

As one form of a vibration-type actuator, a vibration-type actuator including a plurality of piezoelectric elements whose polarities are alternately inverted, a vibration member adhering to the piezoelectric elements, and a movable member pressed against and brought into contact with the vibration member is known. In this vibration-type actuator, a two-phase AC signal, in which each phase has a phase difference of 90° from each other, is applied to each piezoelectric element. Accordingly, a traveling wave is generated on the vibration member, and the movable member may obtain a driving force by a frictional force. The vibration-type actuator is advantageous in that a driving torque at a low speed is great and a response is good, as compared to an actuator using an electromagnetic force.

In general, as a method for controlling a rotation speed or a position of the vibration-type actuator, a method for controlling any one or a combination of a frequency, a voltage amplitude, and a phase difference of an AC voltage is known. In particular, the frequency-based control in which a dynamic range is wide and speed control is easy is the most common control scheme. However, the voltage amplitude-based control and the phase difference-based control considering their characteristics have also been discussed as control schemes. The voltage amplitude-based speed control exhibits a stable control characteristic, particularly in low-speed control, and is effective in high-precision position control, as compared to the frequency-based control. However, a method for changing amplitude of a pulse signal by controlling a supply voltage or a method for changing a gain of an amplifier is necessary to change the voltage amplitude, and there is a problem that a circuit becomes complicated.

As solutions to such an issue, several schemes of changing a pulse width of a pulse signal to change an amplitude of an AC voltage applied to a vibration-type actuator has been discussed. Japanese Patent Application Laid-Open No. 63-305771 discusses the following vibration-type actuator.

Specifically, Japanese Patent Application Laid-Open No. 63-305771 discusses a configuration in which a pulse signal is produced using a known triangular wave comparison scheme PWM modulation, and a voltage corresponding to a desired voltage amplitude is compared with a triangular wave at a higher frequency than a driving frequency to thereby output a signal having a desired voltage amplitude. Further, Japanese Patent Application Laid-Open No. 2007-189823 discusses a technique in which when speed of a movable member is controlled, voltage command value is determined based on a state amount of a vibration-type actuator and a command value of the state amount and a pulse width of a pulse signal is linearly changed according to a change in the voltage command value.

However, in Japanese Patent Application Laid-Open No. 63-305771, the pulse signal is generated at a higher frequency than a driving frequency to linearly change an amplitude of an applied voltage according to a change in command value of a voltage amplitude. Accordingly, there are problems in which a loss increases and a driving circuit becomes complicated due to switching when the pulse signal is generated. Further, in Japanese Patent Application Laid-Open No. 2007-189823, there is a problem in which since the amplitude of the driving voltage is not linearly changed according to a change in a pulse width, an AC voltage having an amplitude according to a command value may not be applied to the vibration-type actuator.

SUMMARY OF THE INVENTION

One disclosed aspect of the embodiments is directed to a driving apparatus for a vibration-type actuator capable of suppressing increase of loss or complication of a driving circuit due to switching when a pulse signal is generated and capable of applying an AC voltage having an amplitude according to a command value in performing driving control using a voltage amplitude.

According to an aspect of the embodiments, a driving apparatus for a vibration-type actuator that applies an AC voltage to an electro-mechanical energy conversion element to vibrate a vibration member and generate a driving force between the vibration member and a movable member that is capable of performing relative movement with respect to the vibration member, and cause the movable member to perform relative movement with respect to the vibration member includes a voltage amplitude command unit configured to instruct an amplitude of the AC voltage; a pulse width command unit configured to monotonically increase a pulse width command and a change rate of the pulse width command according to an increase in a voltage amplitude command output from the voltage amplitude command unit, and configured to output a pulse width command; and a pulse signal generation unit configured, when a pulse signal that directly or indirectly generates the AC voltage is generated at the same frequency as the AC voltage to apply the AC voltage to the electro-mechanical energy conversion element, to generate a pulse signal having a pulse width corresponding to the pulse width command based on the pulse width command output from the pulse width command unit.

According to another aspect of the embodiments, a driving apparatus for a vibration-type actuator that applies an AC voltage to an electro-mechanical energy conversion element to vibrate a vibration member and generate a driving force between the vibration member and a movable member that is capable of performing relative movement with respect to the vibration member, and cause the movable member to perform relative movement with respect to the vibration member includes a detection unit configured to detect a state amount of the vibration-type actuator; a control unit configured to output a voltage amplitude command of the AC voltage according to a difference between the state amount detected by the detection unit and a predetermined state amount; a pulse width command unit configured to monotonically increase a pulse width command and a change rate of the pulse width command according to an increase in the voltage amplitude command output from the control unit, and configured to output a pulse width command; and a pulse signal generation unit configured, when a pulse signal that directly or indirectly generates the AC voltage is generated at the same frequency as the AC voltage to apply the AC voltage to the electro-mechanical energy conversion element, to generate a pulse signal having a pulse width corresponding to the pulse width command based on the pulse width command output from the pulse width command unit.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to describe the principles of the disclosure.

FIGS. 8A, 8B, and 8C are diagrams illustrating set values of conversion table for an "amplitude command signal"-"pulse width command signal" of the driving apparatus for a vibration-type actuator in the first exemplary embodiment.

DESCRIPTION OF THE EMBODIMENTS

Various exemplary embodiments, features, and aspects of the disclosure will be described in detail below with reference to the drawings.

Figure 1:
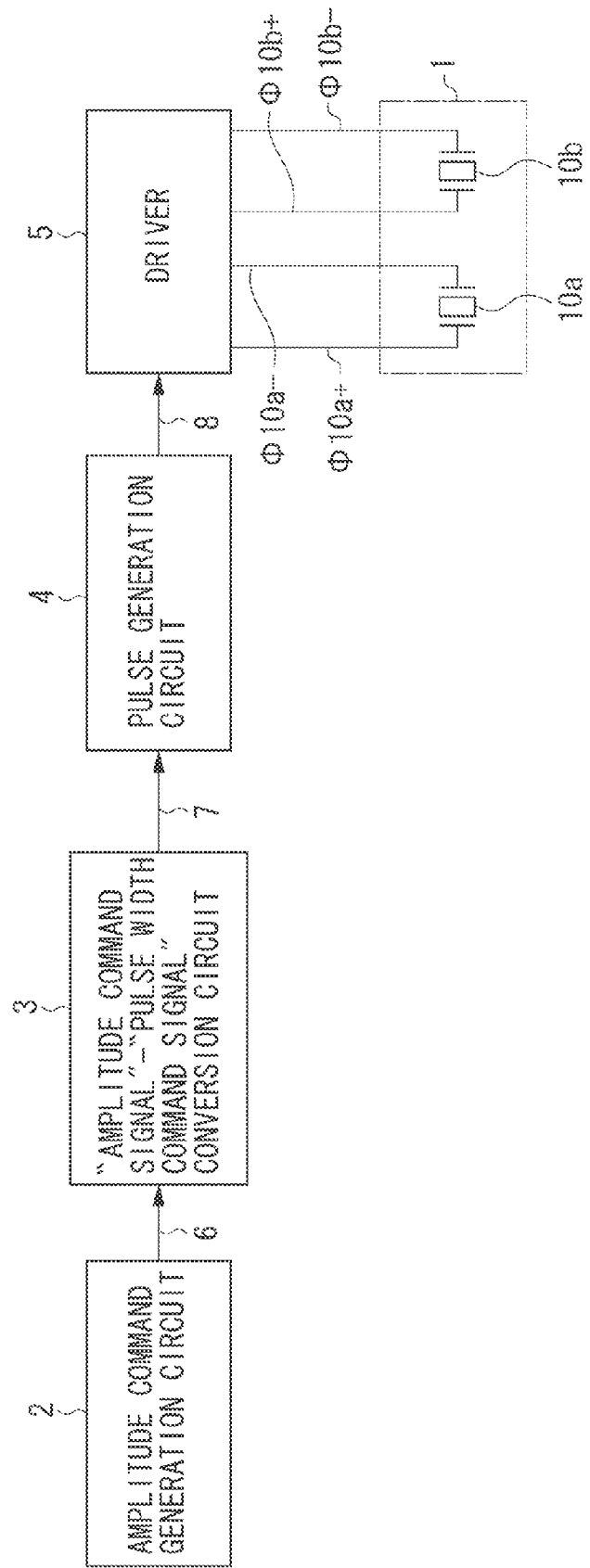
FIG. 1 is a diagram illustrating an example of a configuration of a driving apparatus for a vibration-type actuator in a first exemplary embodiment.

An example of a configuration of a driving apparatus for a vibration-type actuator according to a first exemplary embodiment will be described. The driving apparatus for the vibration-type actuator of the present exemplary embodiment has a configuration in which an AC voltage is applied to an electro-mechanical energy conversion element to vibrate a vibration member, generate a driving force between the vibration member and a movable member that is capable of performing relative movement with respect to the vibration member, and cause the movable member to perform relative movement with respect to the vibration member. FIG. 1 is a block diagram of the driving apparatus for the vibration-type actuator.

In FIG. 1, a vibration-type actuator 1 includes piezoelectric elements 10a and 10b, which will be described below. An amplitude command generation circuit (a voltage amplitude command unit) 2 provides an amplitude command signal 6, which indicates a target value of an amplitude of a driving voltage applied to the vibration-type actuator 1, to an "amplitude command signal"-"pulse width command signal" conversion circuit (a pulse width command unit) 3. The "amplitude command signal"-"pulse width command signal" conversion circuit 3 outputs a pulse width command signal 7 corresponding to a pulse width of a pulse signal 8 output by a pulse generation circuit (a pulse signal generation unit) 4, which will be described below, based on the amplitude command signal 6 from the amplitude command generation circuit 2. The pulse generation circuit 4 generates the pulse signal 8 having the pulse width corresponding to the pulse width command signal 7 and sends the pulse signal 8 to a driver 5. Accordingly, in response to the pulse signal 8, a switching element of a driving circuit of the driver 5, which will be described below, is turned ON, and an AC signal Φ10a+ and Φ10a− and an AC signal Φ10b+ and Φ10b− are applied to the piezoelectric elements 10a and 10b, respectively.

Figure 2:
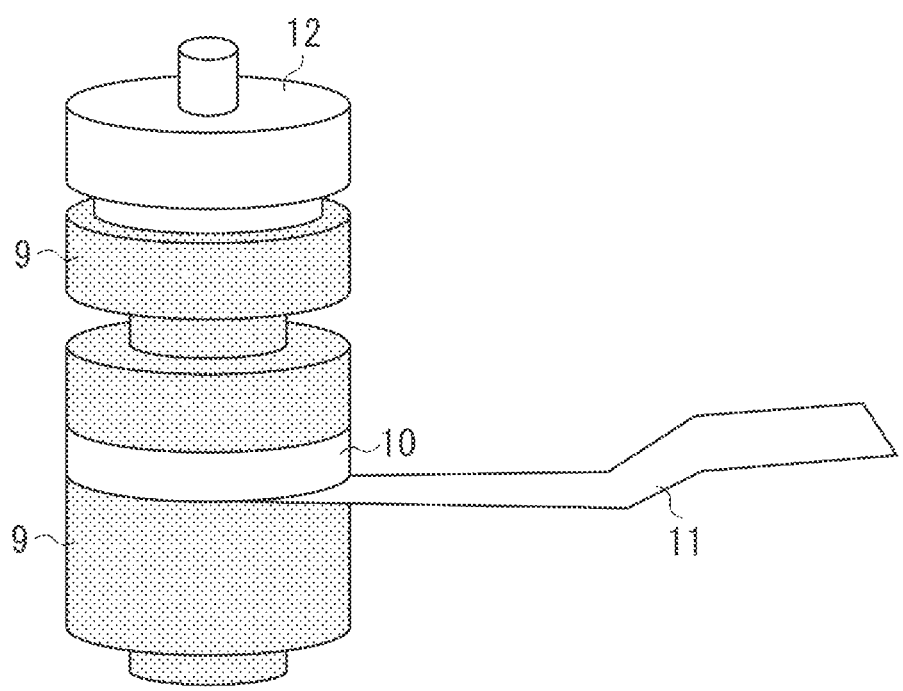
FIG. 2 is a view illustrating an example of a configuration of the vibration-type actuator in the first exemplary embodiment.
Figure 3:
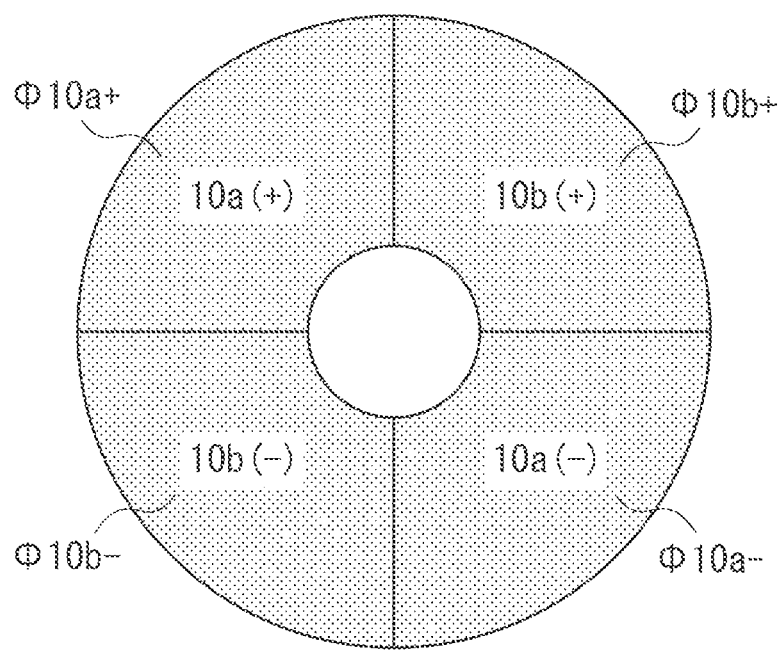
FIG. 3 is a view illustrating an electrode pattern for voltage supply formed on a piezoelectric element of the vibration-type actuator in the first exemplary embodiment.

Next, a concrete configuration of the vibration-type actuator 1 will be described. FIG. 2 is a view illustrating the configuration of the vibration-type actuator 1. A vibration member 9 is vibrated by a piezoelectric element 10 which will be described below, the stacked piezoelectric element 10 is pinched by the vibration member 9, and a flexible printed circuit 11 supplies a voltage to the piezoelectric element 10. A rotor 12 rotates according to a frictional force generated with elliptic vibration formed on a top surface of the vibration member 9. FIG. 3 illustrates an electrode pattern for voltage supply formed on the piezoelectric element 10. AC signals Φ10a+ and Φ10b+ having a phase in which each phase has difference of 90° from each other, are applied to electrodes 10a(+) and 10b(+).

Figure 4:
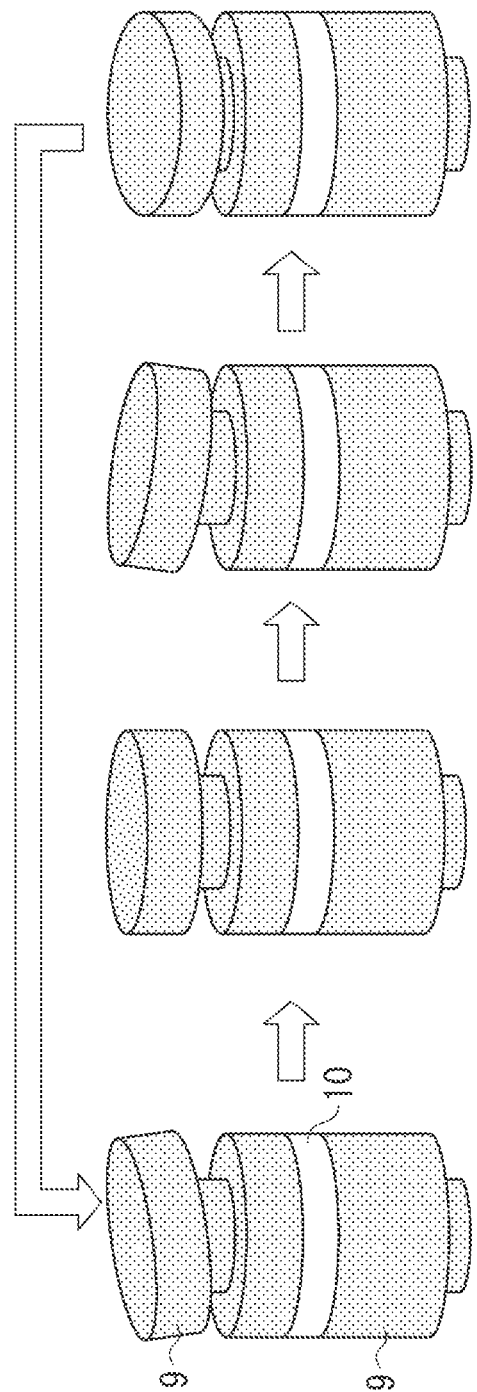
FIG. 4 is a view illustrating a temporal change of vibration of a vibrator of the vibration-type actuator in the first exemplary embodiment.
Figure 5:
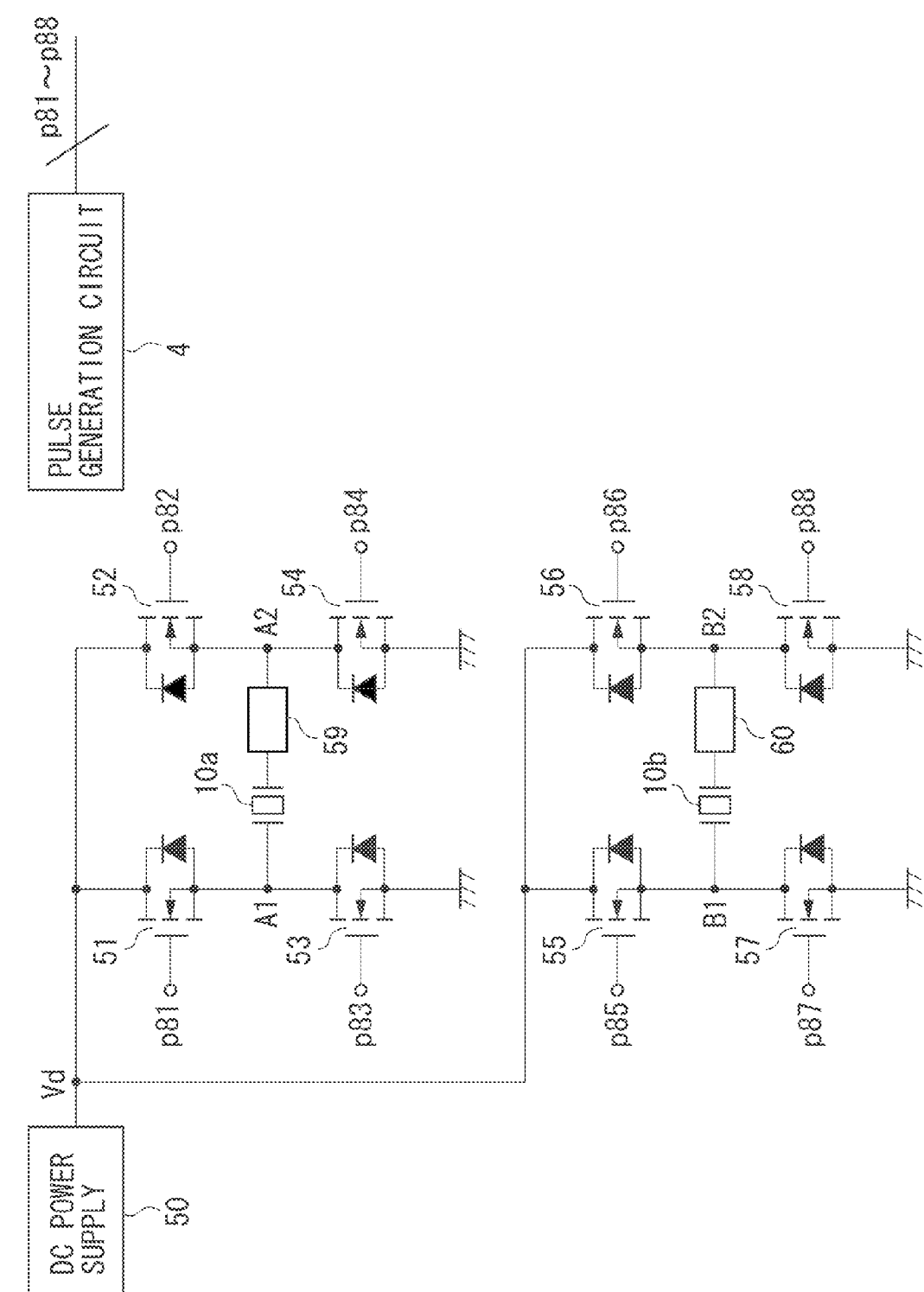
FIG. 5 is a diagram illustrating a circuit of a driver of the vibration-type actuator in the first exemplary embodiment.

Further, AC signals Φ10a− and Φ10b− having a phase in which each phase has difference of 180° from (+) electrodes are applied to the respective (−) electrodes. When the driving voltages having this phase relationship are applied to the respective electrodes, two bending vibrations orthogonal to a rod-shaped vibrator are formed. Accordingly, an upper part of the vibration member 9 with a constricted part is rotationally vibrated as if it is swinging around, as illustrated in FIG. 4. This rotational vibration delivers the driving force to the rotor 12 that is pressed against and brought into contact with the vibration member 9. In FIG. 1, the "amplitude command signal"-"pulse width command signal" conversion circuit 3 changes the pulse width command signal 7 in a state of an inverse sine function according to the increase in the amplitude command signal 6. Hereinafter, a reason therefor will be described. FIG. 5 illustrates a driving circuit of the driver 5 of FIG. 1, which includes two full-bridge circuits including switching elements 51 to 58. The outputs of two full-bridge circuits is connected to the piezoelectric elements 10a and 10b which are connected to inductors 59 and 60 respectively in series. p81 to p88 corresponding to the pulse signal 8 in FIG. 1 are applied to each of gates of the switching elements 51 to 58.

Figure 6A:
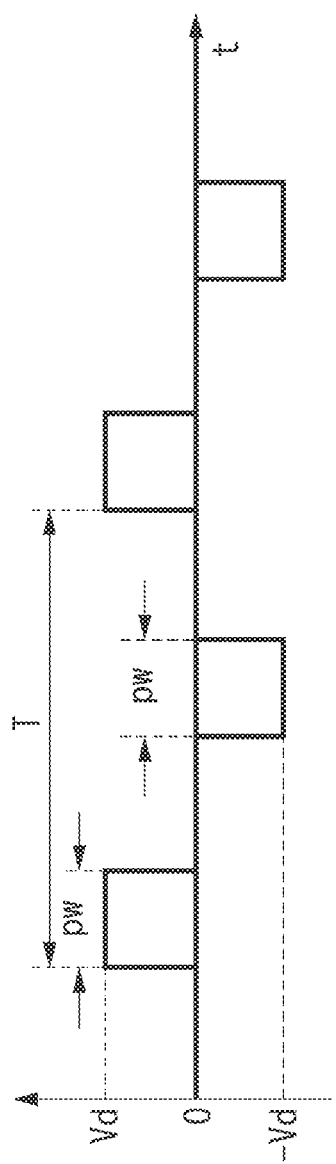
FIGS. 6A, 6B, 6C, and 6D are diagrams illustrating a temporal change of a voltage applied to a piezoelectric element of the vibration-type actuator in the first exemplary embodiment.
Figure 6B:
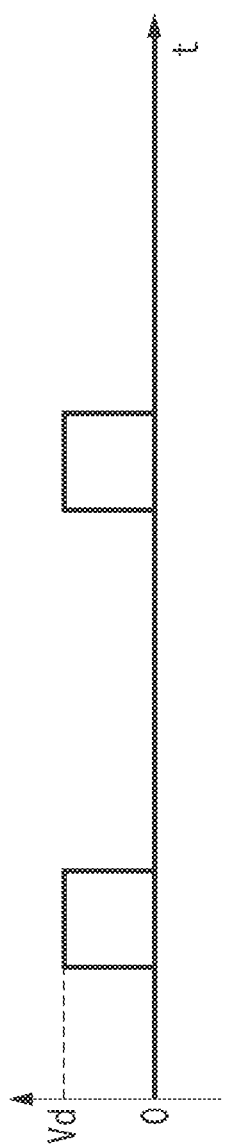
Figure 6C:
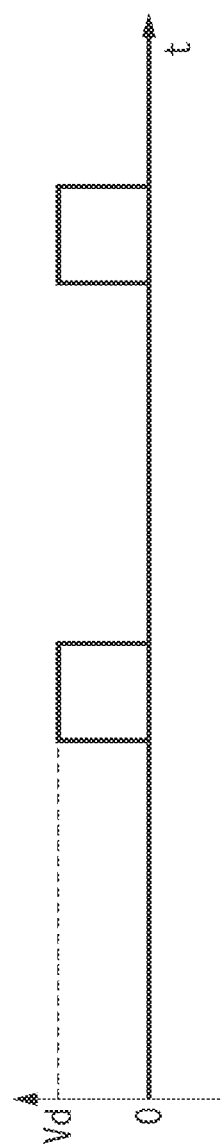
Figure 6D:
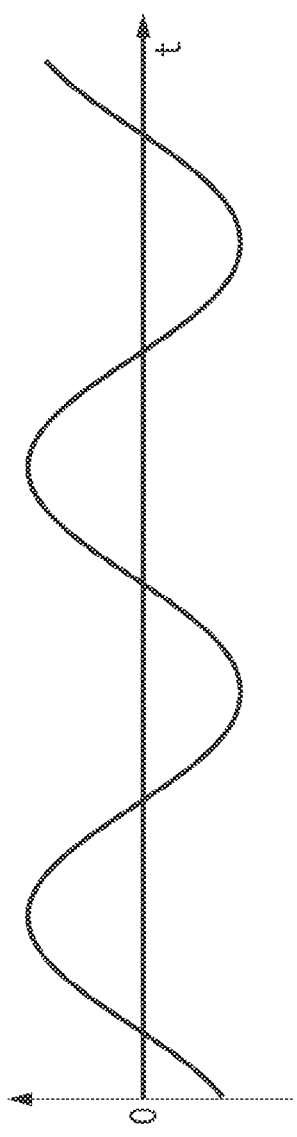

Next, a temporal change of a voltage at each point of the driving circuit will be described. FIGS. 6A to 6D are timing diagrams when the vibration-type actuator 1 is driven in which the pulse signals p81 to p88 illustrated in FIG. 5 have a period of T and an ON time of PW. FIG. 6A illustrates a voltage waveform between A1 and A2, FIG. 6B illustrates a voltage waveform at A1, FIG. 6C illustrates a voltage waveform at A2, and FIG. 6D illustrates a voltage waveform applied across the piezoelectric element 10a.

When the voltage waveform in FIG. 6A is performed Fourier transform, the following Equation (1) is obtained.

$$F(t) = \sum_{n=1}^{\infty} b(n) \cdot \sin\frac{2n\pi}{T}t \qquad (1)$$
$$= \frac{4}{\pi} \cdot Vd \cdot \sum_{n=1}^{\infty} \frac{1}{n} \cdot \sin\frac{n\pi PW}{T} \cdot \sin\frac{n\pi}{2} \cdot \sin\frac{2n\pi}{T}t$$

Accordingly, a coefficient b(n) in each order n is represented by the following Equation (2). Equation (2) represents a relationship between the pulse width and the voltage amplitude. Equation (2) includes no time parameter and is independent of time.

$$\begin{cases} b(n) = \frac{4}{\pi} \cdot Vd \cdot \frac{1}{n} \cdot \sin\frac{n\pi PW}{T} \cdot \sin\frac{n\pi}{2} & (n: \text{odd}) \\ b(n) = 0 & (n: \text{even}) \end{cases} \qquad (2)$$

Where, Vd is a value of a voltage supplied from the DC power supply 50 to the full-bridge circuit. A relationship between the pulse width and the voltage amplitude when the pulse width, i.e., PW/T[%], is changed in a fundamental wave (n=1) of Equation (2) is illustrated in FIG. 7.

Figure 7:
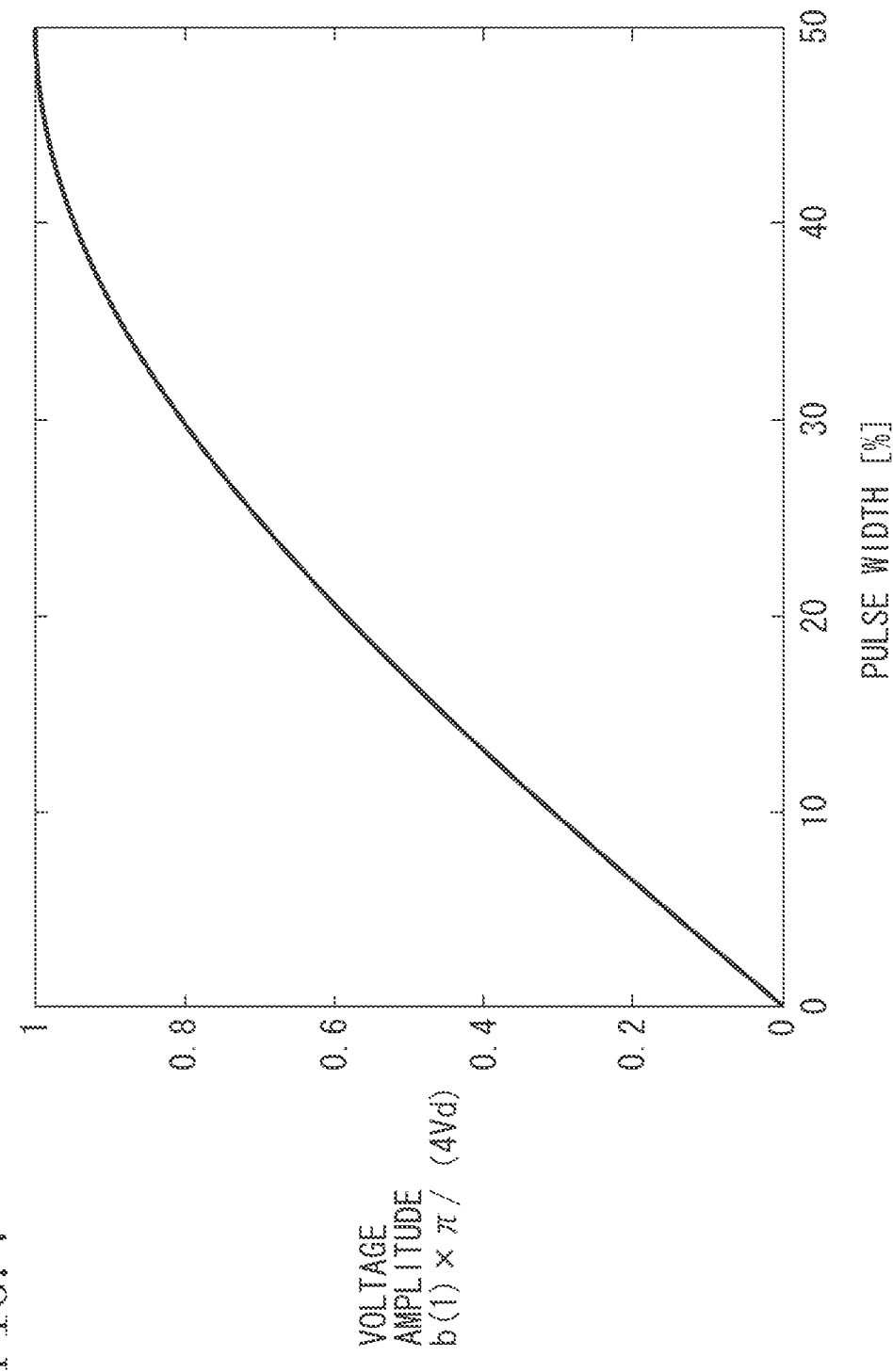
FIG. 7 is a diagram illustrating a relationship between a pulse width and a voltage amplitude of the driving apparatus for a vibration-type actuator in the first exemplary embodiment.

As may be seen from FIG. 7, a change in the voltage amplitude is reduced as the pulse width increases even when a change amount of the pulse width is the same. Accordingly, to apply a voltage having an amplitude corresponding to the amplitude command signal 6 to the vibration-type actuator 1, it is necessary to monotonically increase the pulse width command signal 7 and the change rate of the pulse width command signal 7 according to the increase in the amplitude command signal 6. The "amplitude command signal"-"pulse width command signal" conversion circuit 3 stores an "amplitude command signal"-"pulse width command signal" conversion table for changing the pulse width command signal 7 to the amplitude command signal 6 in a state of an inverse sine function. Further, the "amplitude command signal"-"pulse width command signal" conversion table is set so that the pulse width command signal 7 and the change rate of the pulse width command signal 7 monotonically increase 50% according to the increase in the amplitude command signal 6 when the amplitude command signal 6 increases to a maximum value (signal value is normalized with maximum value defined as 1 in the present exemplary embodiment).

Figure 8B:
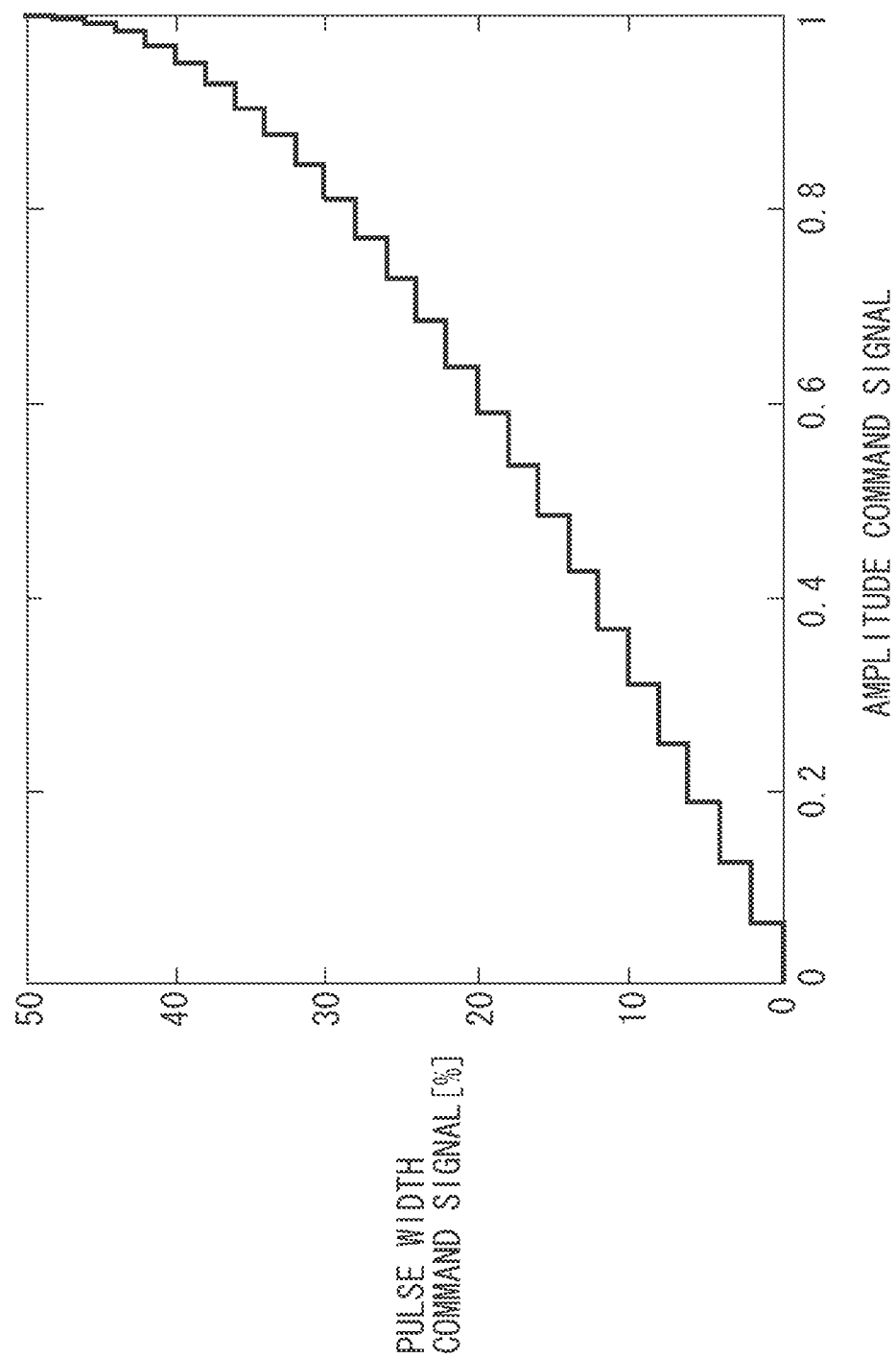
Figure 8C:
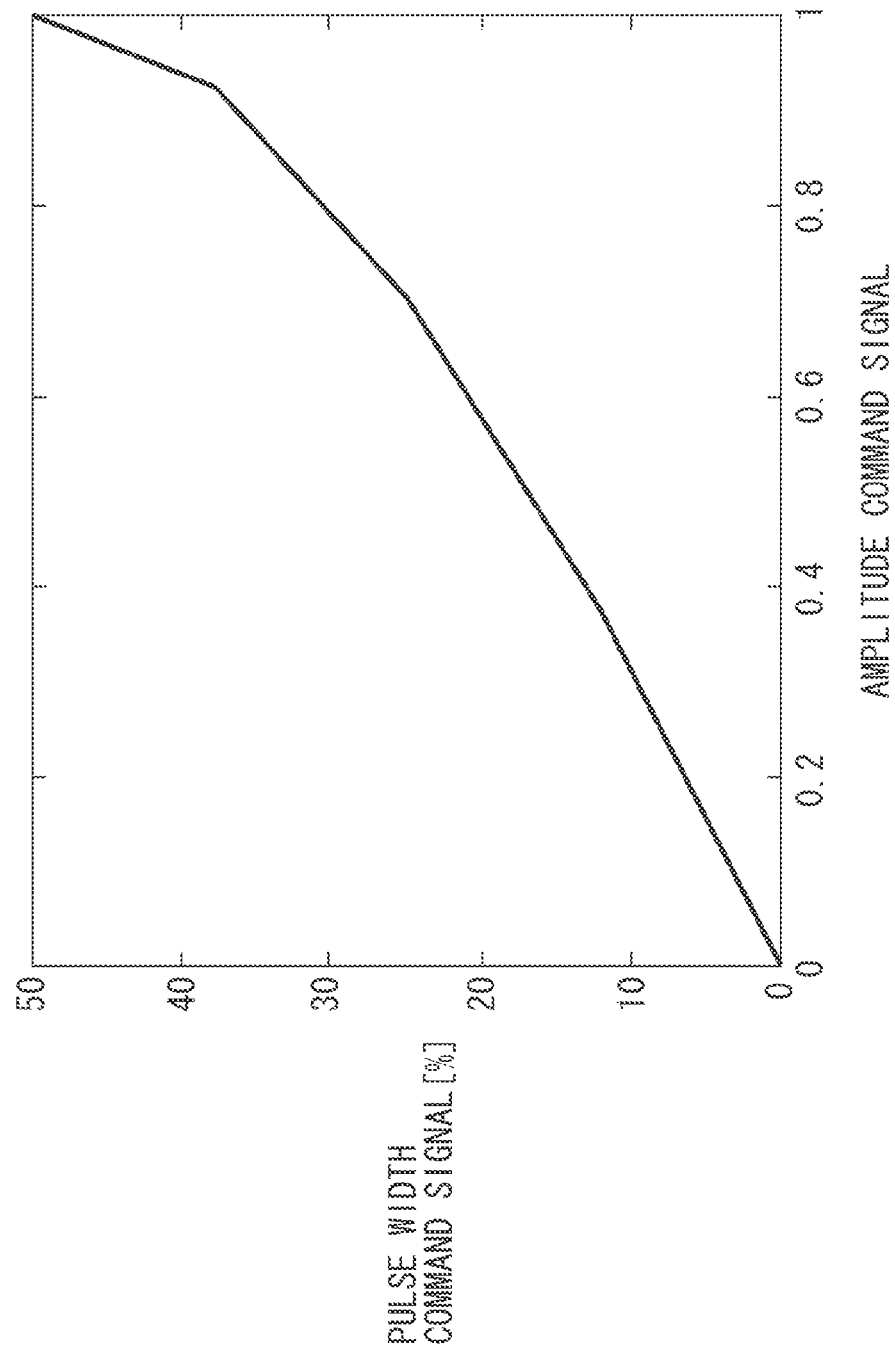

FIG. 8A illustrates a relationship between the amplitude command signal 6 and the pulse width command signal 7 set in the "amplitude command signal"-"pulse width command signal" conversion table. Further, the "amplitude command signal"-"pulse width command signal" conversion table may be set to a value in which the pulse width command signal 7 is changed stepwise with respect to the amplitude command signal 6, or is linearly approximated to the amplitude command signal 6 as illustrated in FIGS. 8B and 8C, or may be set to a value of combination of above values. As shown in FIGS. 8A-8C, the table converts the amplitude command signal to the pulse width command signal without the time parameter. This conversion is independent of time. Thus, as the pulse width command signal and a change rate of the pulse width command signal monotonically increase in a shape of an inverse sine function according to the increase in the amplitude command signal and independently of time, a driving voltage having an amplitude according to the amplitude command signal may be applied to the vibration-type actuator. Accordingly, a modulation wave may be generated according to a command value when the amplitude of the driving voltage is modulated, and high-precision control may be performed when the state amount of the vibration-type actuator is controlled using the amplitude of the driving voltage.

In the present exemplary embodiment, a case in which the vibration-type actuator is driven by a pulse signal having wave height values of +Vd and −Vd as in FIG. 6A is illustrated by way of example. On the other hand, even when the vibration-type actuator is driven by a pulse signal having only a wave height value +Vd or −Vd, a relationship between a voltage amplitude of a fundamental wave and a pulse width of the pulse signal is an inverse sine function relationship illustrated in FIG. 7. Accordingly, the vibration-type actuator may be driven using the pulse signal having only +Vd or −Vd. According to the present exemplary embodiment, an amplitude of a component of a fundamental frequency (a frequency of the AC voltage) of the pulse signal that has the same frequency as the AC voltage and that directly or indirectly generates the AC voltage may have an amplitude value that is proportional to the voltage amplitude command. Accordingly, a circuit that applies an AC voltage having any amplitude to the vibration-type actuator may be configured by an efficient and inexpensive circuit.

Figure 9:
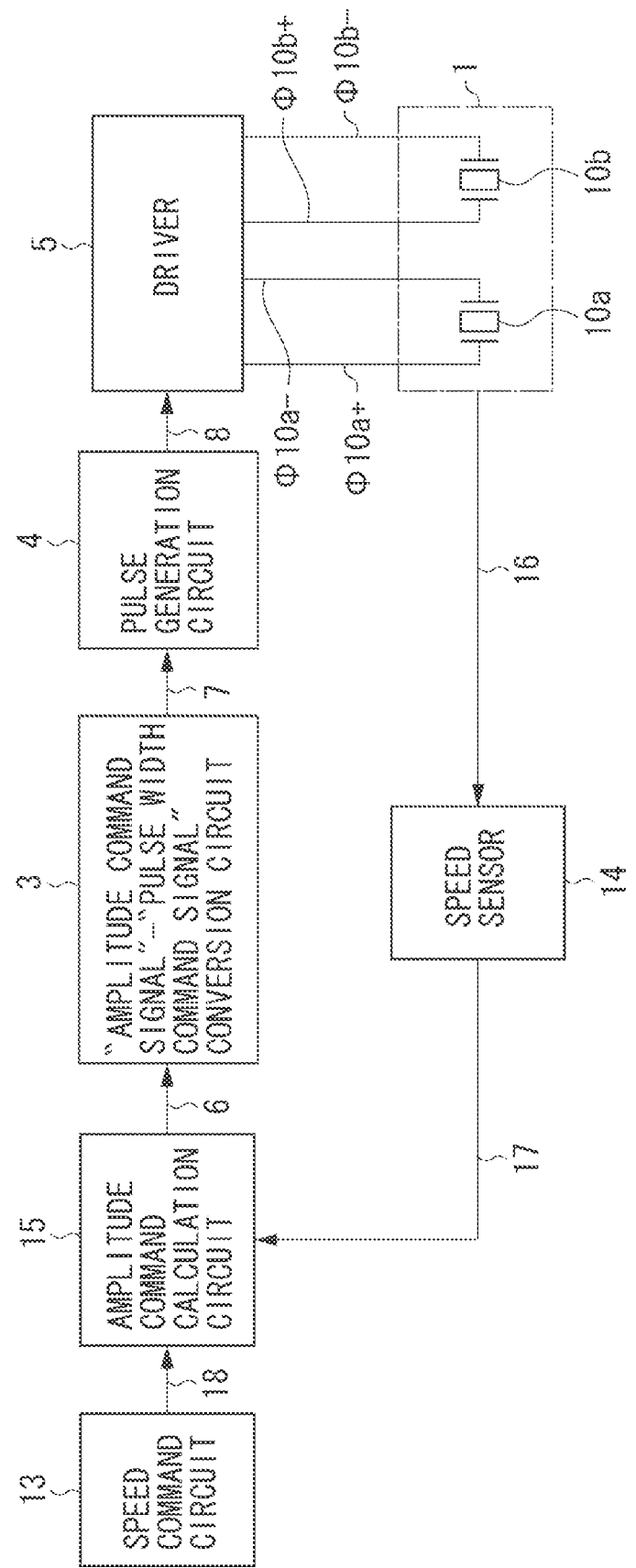
FIG. 9 is a diagram illustrating an example of a configuration of a driving apparatus for a vibration-type actuator in a second exemplary embodiment.

An example of a configuration of a speed control device of a vibration-type actuator that performs speed control by controlling the amplitude of the driving voltage determined according to a difference between a target speed and a real driving speed, using the pulse width of the pulse signal, according to a second exemplary embodiment will be described. However, since a basic configuration other than a configuration for controlling the rotation speed of the vibration-type actuator is similar to that of the first exemplary embodiment, a detailed description thereof will not be repeated. FIG. 9 is a block diagram illustrating the speed control device of the vibration-type actuator. In FIG. 9, a speed command unit 13 generates a speed command signal 18 that indicates a target speed of the vibration-type actuator 1 and sends the speed command signal 18 to an amplitude command calculation unit 15, which will be described below. A speed sensor (unit for detecting a rotation speed of the actuator) 14 detects a rotation speed 16 that is a state amount (a real driving speed) of the vibration-type actuator 1, and sends a speed detection signal 17 to the amplitude command calculation unit 15. The amplitude command calculation unit 15 is a control circuit that outputs a voltage amplitude command of an AC voltage according to a difference between the state amount detected by the speed sensor 14 and a predetermined state amount. Specifically, the amplitude command calculation unit 15 performs proportional-integral calculation using the speed detection signal 17 and the speed command signal 18 so that the amplitude of the driving voltage increases as the speed command signal 18 increases, and sends an amplitude command signal 6, which is a calculation result, to the "amplitude command signal"-"pulse width command signal" conversion circuit 3.

The "amplitude command signal"-"pulse width command signal" conversion circuit 3 converts the amplitude command signal 6 into a pulse width command signal 7 based on the "amplitude command signal"-"pulse width command signal" conversion table illustrated in the present exemplary embodiment. This enables the amplitude of the driving voltage applied to the vibration-type actuator 1 to be linearly changed according to the change in the amplitude command signal 6. If the pulse width command signal 7 is linearly changed according to the change in the amplitude command signal 6, the control is likely to be unstable since a change amount of the amplitude of the driving voltage is different depending on the value of the pulse width command signal 7 even when the change amount of the amplitude command signal 6 is the same. However, if the vibration-type actuator 1 is driven by the speed control device of the present exemplary embodiment, more stable speed control may be performed since a change in the amplitude of the driving voltage according to the change in the amplitude command signal 6 may always be constant. According to the present exemplary embodiment, when the vibration-type actuator is controlled, a change amount of the amplitude of the AC voltage applied to the vibration-type actuator according to a difference between the state amount and the target state amount may always be constant regardless of the value of the pulse width and more stable control may be performed. Further, while in the present exemplary embodiment, a speed is used as the state amount, a torque or a vibration amplitude of the vibrator other than the speed may be used as the state amount.

Figure 11:
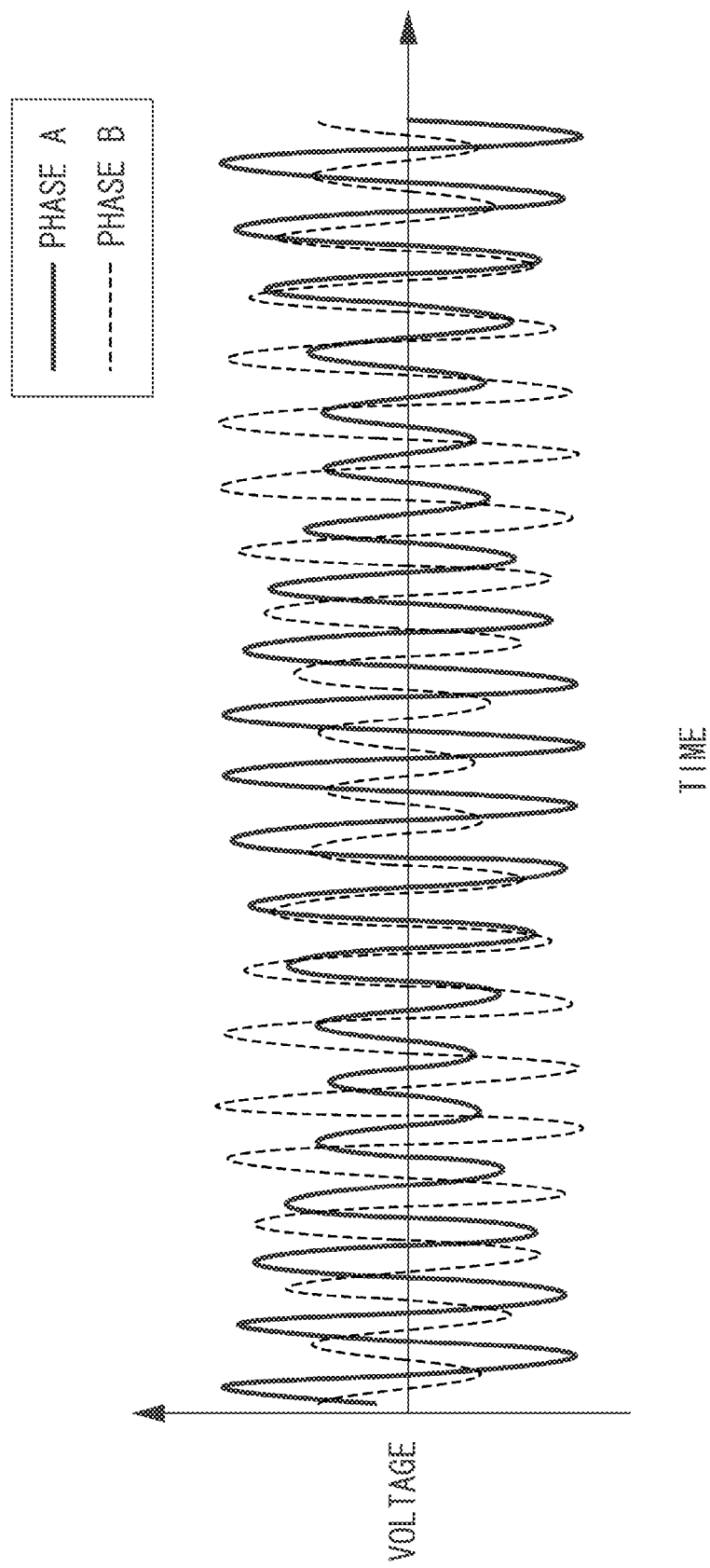
FIG. 11 is a diagram illustrating a vibration signal for generating an amplitude modulation traveling vibration wave of the driving apparatus for a vibration-type actuator in the third exemplary embodiment.

An example of a configuration of the driving apparatus for the vibration-type actuator that applies a two-phase AC signal having periodically varying amplitude and phase difference to the vibration-type actuator to drive the vibration-type actuator at low speed according to a third exemplary embodiment will be described. In the present exemplary embodiment, an amplitude modulation traveling vibration wave whose vibration amplitude is modulated in a predetermined period (according to a periodic modulation pattern) is generated in a vibrator to stably drive the vibration-type actuator at low speed. The amplitude modulation traveling vibration wave described in the present exemplary embodiment is formed by combining two phase (phase A and phase B) vibration signals having different phases as illustrated in FIG. 11.

Figure 12:
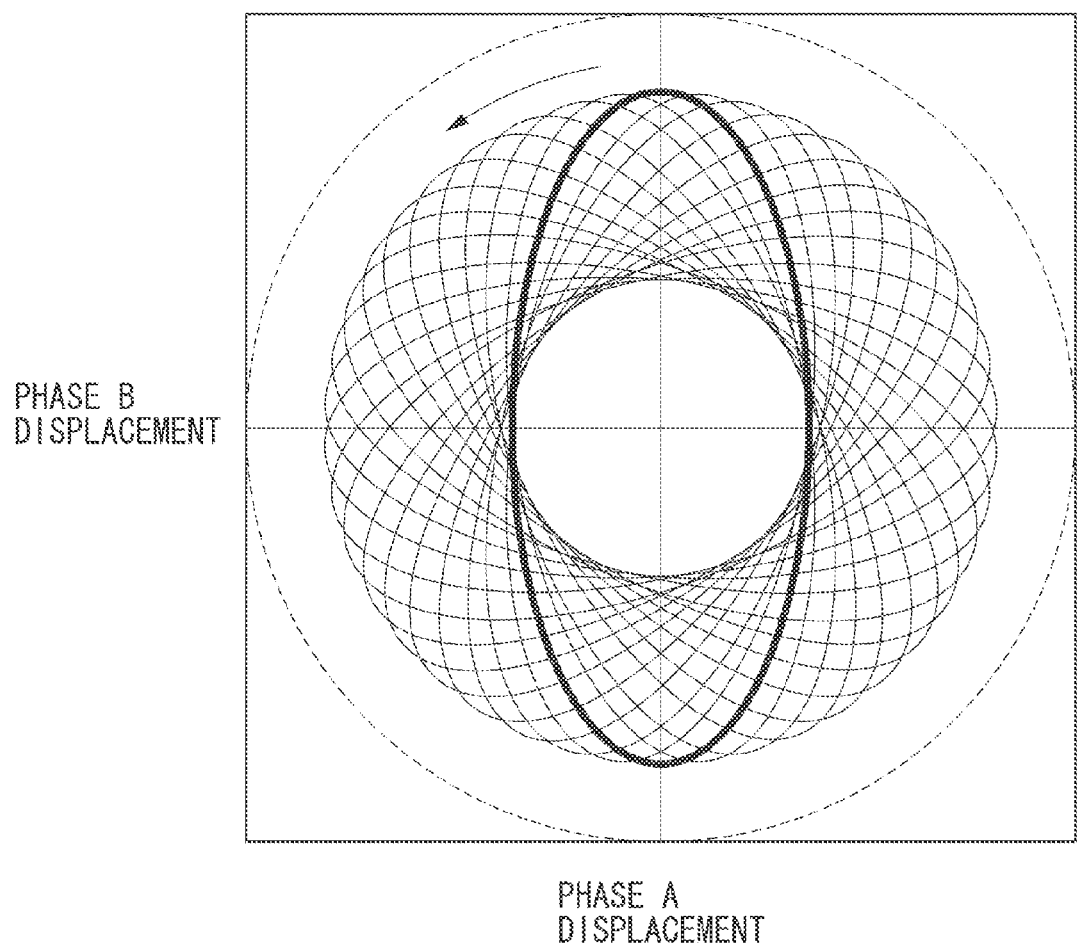
FIG. 12 is a diagram illustrating a vibration locus of the amplitude modulation traveling vibration wave of the driving apparatus for a vibration-type actuator in the third exemplary embodiment.

In FIG. 12, a vibration locus of an amplitude modulation traveling vibration wave excited in the vibrator is indicated by a solid line. Further, an ellipse indicated by a bold line in FIG. 12 is a vibration locus (hereinafter referred to as an elliptical locus) of one period of the vibration locus. A plurality of elliptical loci indicated by thin lines indicates states of rotation of the elliptical locus. An arrow indicates a rotation direction of the elliptical locus. Further, a phase A displacement indicates a vibration displacement in a direction connecting centers of the electrode 10*a*(+) and the electrode 10*a*(−) illustrated in FIG. 3. A phase B displacement indicates a vibration displacement in a direction connecting centers of the electrode 10*b*(+) and the electrode 10*b*(−). When the vibration-type actuator is driven using the amplitude modulation traveling vibration wave vibrating along the elliptical locus, a rotation speed of the rotor may be controlled in proportion to a vibration amplitude in a short-axis direction while sufficiently floating the rotor from the vibration member through vibration in a long-axis direction of the elliptical locus. Accordingly, the vibration-type actuator may be stably driven at low speed. Further, as the long-axis direction of the elliptical locus is rotated in a certain period, a speed change caused by surface pressure fluctuation between the rotor and the movable member is reduced.

Figure 10:
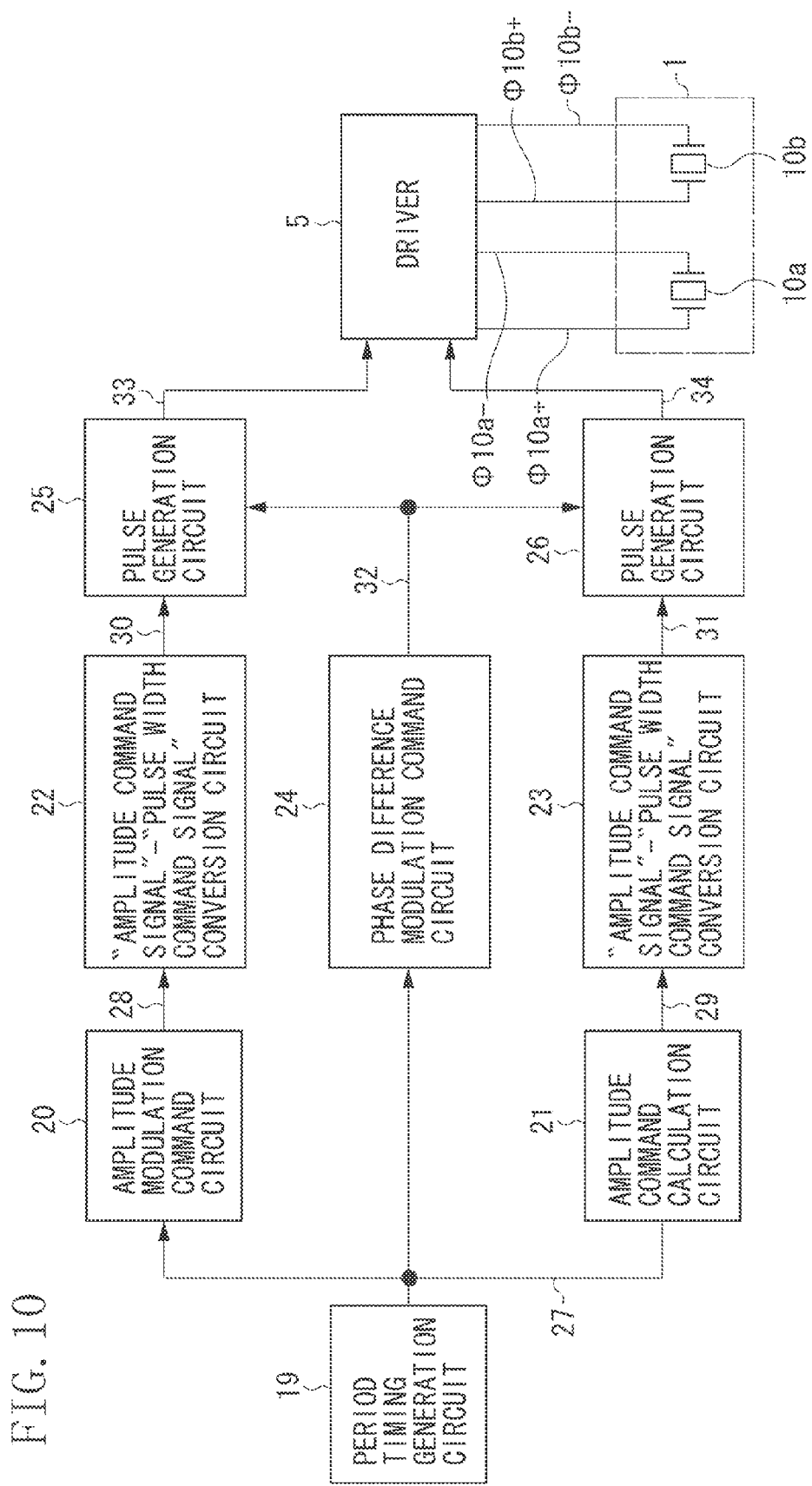
FIG. 10 is a diagram illustrating an example of a configuration of a driving apparatus for a vibration-type actuator in a third exemplary embodiment.

Next, an operation of a driving apparatus of the present exemplary embodiment illustrated in FIG. 10 will be described. FIG. 10 is a block diagram of the driving apparatus for the vibration-type actuator. A period timing generation unit 19 generates a period timing signal 27 for generating amplitude command signals 28 and 29 from amplitude modulation command units 20 and 21, which will be described below. When the amplitude modulation command units 20 and 21 receive the period timing signal 27, the amplitude modulation command units 20 and 21 generate previously stored amplitude command signals 28 and 29 and send the amplitude command signals 28 and 29 to "amplitude command signal"-"pulse width command signal" conversion circuits 22 and 23 so that a modulation wave illustrated in FIG. 11 is applied to the vibration-type actuator 1. The "amplitude command signal"-"pulse width command signal" conversion circuits 22 and 23 are the same as the "amplitude command signal"-"pulse width command signal" conversion circuit 3 described in the first exemplary embodiment and the second exemplary embodiment. The "amplitude command signal"-"pulse width command signal" conversion circuits 22 and 23 convert the amplitude command signals 28 and 29 into pulse width command signals 30 and 31 based on the "amplitude command signal"-"pulse width command signal" conversion table, and send the pulse width command signals 30 and 31 to pulse generation units 25 and 26 respectively. If a phase difference modulation command unit 24 receives the period timing signal 27, the phase difference modulation command unit 24 provides a phase difference signal 32 corresponding to a temporal phase of the pulse signals generated by the pulse generation units 25 and 26 to the pulse generation units 25 and 26. The pulse generation units 25 and 26 generate pulse signals 33 (p81 to p84 in FIGS. 5) and 34 (p85 to p88 in FIG. 5) having a pulse width corresponding to the pulse width command signals 30 and 31 respectively, with a temporal phase corresponding to the phase difference signal 32. Also, a driver 5 generates driving voltages Φ10*a*+, Φ10*a*−, Φ10*b*+, and Φ10*b*− of phase A and phase B using the pulse signals 33 and 34 and applies the driving voltages to a vibration-type actuator 1.

By constituting the driving apparatus that performs the operation as described above, a vibration in which a size of a long-axis component of the elliptical locus as illustrated in FIG. 12 is constant regardless of a rotation change in the long-axis direction of the elliptical locus may be formed. On the other hand, when the pulse width command signals 30 and 31 are linearly changed according to the change in the amplitude command signals 28 and 29 to generate the amplitude modulation traveling vibration wave, a shape of the elliptical locus is changed according to the rotation change in the long-axis direction of the elliptical locus, and rotational fluctuation is generated. Accordingly, if the vibration-type actuator is driven by the present scheme, the rotational fluctuation is reduced and the vibration-type actuator may be more stably driven, as compared to the scheme of linearly changing the pulse width command signal according to the change in the amplitude command signal to drive the vibration-type actuator. In the present exemplary embodiment, the amplitude modulation command units and the "amplitude command signal"-"pulse width command signal" conversion circuits units are divided in two. However, if the amplitude of the output driving voltage like the modulation wave is known, a pulse width calculated based on the "amplitude command signal"-"pulse width command signal" conversion table may be stored in the amplitude modulation command unit and the pulse width command signal may be directly generated. Further, while in the present exemplary embodiment, the period timing signal 27 is generated in synchronization with a time, the period timing signal 27 may be generated in synchronization with rotation position information of the rotor. Further, the state amount may be detected by a state amount detection unit, which is not illustrated, and degrees of modulation of the amplitude modulation command units 20 and 21 and the phase difference modulation command unit 24 may be changed according to the state amount.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-199514 filed Sep. 13, 2011, which is hereby incorporated by reference herein in its entirety.

What is claimed is:

1. A driving apparatus for a vibration-type actuator comprising an electro-mechanical energy conversion element and a vibration member wherein a relative position of a contact portion of the vibration member and a contact portion of a movable member is changed by application of an AC voltage to the electro-mechanical energy conversion element, the driving apparatus comprising:
   a voltage amplitude command unit configured to output an amplitude command signal to indicate a target value of an amplitude of the AC voltage applied to the vibration-type actuator;
   a pulse width command unit configured to monotonically increase a pulse width command signal and a change rate of the pulse width command signal according to an increase in the amplitude command signal, and configured to output a pulse width command signal; and
   a pulse signal generation unit configured to generate a pulse signal having a pulse width corresponding to the pulse width command based on the pulse width command output from the pulse width command unit and having the same frequency as the AC voltage,
   wherein the pulse width command unit is configured to monotonically increase the pulse width command signal and the change rate of the pulse width command signal by using at least one of a function of an amplitude in an amplitude command signal and a table for converting an amplitude command signal to a pulse width command signal,
   wherein the function of the amplitude in the amplitude command signal is a function independent of time, and
   wherein the table converts the amplitude command signal to a pulse width command signal independently of time.

2. The driving apparatus for a vibration-type actuator according to claim 1, wherein the pulse width command unit is configured to set the pulse width command signal according to an inverse sine function of the amplitude command signal.

3. The driving apparatus for a vibration-type actuator according to claim 1, wherein the voltage amplitude command unit is configured to change the amplitude command signal in a predetermined periodic modulation pattern.

4. A device comprising:
   the vibration-type actuator; and
   the driving apparatus for the vibration-type actuator according to claim 1.

5. A driving apparatus for a vibration-type actuator comprising an electro-mechanical energy conversion element, wherein a relative position of a contact portion of a vibration member and a contact portion of a movable member is changed by application of an AC voltage to the electro-mechanical energy conversion element, the driving apparatus comprising:
   a detection unit configured to detect a state amount of the vibration-type actuator;
   a control unit configured to output an amplitude command signal of the AC voltage applied to the vibration-type actuator according to a difference between the state amount detected by the detection unit and a predetermined state amount;
   a pulse width command unit configured to monotonically increase a pulse width command signal and a change rate of the pulse width command signal according to an increase in the amplitude command signal, and configured to output a pulse width command signal; and
   a pulse signal generation unit configured to generate a pulse signal having a pulse width corresponding to the pulse width command signal based on the pulse width command signal output from the pulse width command unit and having the same frequency as the AC voltage,
   wherein the pulse width command unit is configured to monotonically increase the pulse width command signal and the change rate of the pulse width command signal by using at least one of a function of an amplitude in an amplitude command signal and a table for converting an amplitude command signal to a pulse width command signal,
   wherein the function of the amplitude in the amplitude command signal is a function independent of time, and
   wherein the table converts the amplitude command signal to a pulse width command signal independently of time.

6. The driving apparatus for a vibration-type actuator according to claim 5, wherein the pulse width command unit is configured to set the pulse width command according to an inverse sine function of the amplitude command signal.

7. The driving apparatus for a vibration-type actuator according to claim 5, wherein the voltage amplitude command unit is configured to change the amplitude command signal in a predetermined periodic modulation pattern.

8. A device comprising:
   the vibration-type actuator; and
   the driving apparatus for the vibration-type actuator according to claim 5.

* * * * *